(12) United States Patent
Ahmadi et al.

(10) Patent No.: US 11,726,280 B2
(45) Date of Patent: Aug. 15, 2023

(54) DUAL THERMAL CONTROL ELEMENT CONFIGURATION FOR OPTO-MECHANICAL ASSEMBLY

(71) Applicant: Lumentum Operations LLC, San Jose, CA (US)

(72) Inventors: Roozbeh Ahmadi, Ottawa (CA); Nenad Duricic, Ottawa (CA); Shane H. Woodside, Ottawa (CA); Doug Cross, Ottawa (CA); Andrew Telford, Ottawa (CA)

(73) Assignee: Lumentum Operations LLC, San Jose, CA (US)

( * ) Notice: Subject to any disclaimer, the term of this patent is extended or adjusted under 35 U.S.C. 154(b) by 26 days.

(21) Appl. No.: 17/357,274

(22) Filed: Jun. 24, 2021

(65) Prior Publication Data
US 2022/0326458 A1 Oct. 13, 2022

Related U.S. Application Data

(60) Provisional application No. 63/174,241, filed on Apr. 13, 2021.

(51) Int. Cl.
*G02B 6/42* (2006.01)
*G02B 7/02* (2021.01)

(52) U.S. Cl.
CPC ......... *G02B 6/4266* (2013.01); *G02B 6/4206* (2013.01); *G02B 6/4214* (2013.01); *G02B 7/028* (2013.01)

(58) Field of Classification Search
CPC .. G02B 6/4266; G02B 6/4206; G02B 6/4214; G02B 6/356; G02B 6/3586; G02B 7/028; G02B 7/008
See application file for complete search history.

(56) References Cited

U.S. PATENT DOCUMENTS

| | | | |
|---|---|---|---|
| 6,771,437 B1* | 8/2004 | Willis | G01M 11/04 359/822 |
| 2004/0042742 A1* | 3/2004 | Bradshaw | G02B 6/4201 385/94 |
| 2004/0202210 A1* | 10/2004 | Thornton | H01S 5/06804 372/20 |
| 2013/0049041 A1* | 2/2013 | Ramer | H01S 5/02423 257/432 |

(Continued)

*Primary Examiner* — Ryan A Lepisto
*Assistant Examiner* — Erin D Chiem
(74) *Attorney, Agent, or Firm* — Harrity & Harrity, LLP

(57) ABSTRACT

An opto-mechanical assembly includes a first thermal control element disposed on a region of a first section of an enclosure; a second thermal control element disposed on a region of a second section of the enclosure; and an optical element that includes a first portion and a second portion. The first thermal control element is configured to heat the first portion of the optical element and to cause the first portion of the optical element to be associated with a first temperature, and the second thermal control element is configured to heat the second portion of the optical element and to cause the second portion of the optical element to be associated with a second temperature. This causes a difference between the first temperature and the second temperature to satisfy a temperature difference threshold. Accordingly, this also causes a temperature gradient along an axis of the optical element to satisfy a temperature gradient threshold.

20 Claims, 4 Drawing Sheets

(56) References Cited

U.S. PATENT DOCUMENTS

2016/0109669 A1* 4/2016 Moidu ................ G02B 6/4267
                                                                                385/16
2019/0094482 A1* 3/2019 Ahmadi ................ G02B 7/008

* cited by examiner

DUAL THERMAL CONTROL ELEMENT CONFIGURATION FOR OPTO-MECHANICAL ASSEMBLY

RELATED APPLICATION

This application claims priority to U.S. Provisional Patent Application No. 63/174,241, entitled "DUAL HEATERS WITH RESPECTIVE CONTROLLERS FOR AN ISO-THERMAL OPTICAL BENCH ASSEMBLY," filed on Apr. 13, 2021, the content of which is incorporated by reference herein in its entirety.

TECHNICAL FIELD

The present disclosure relates generally to an opto-mechanical assembly and to a dual thermal control element configuration for the opto-mechanical assembly.

BACKGROUND

An opto-mechanical assembly, such as a wavelength selective switch (WSS), may be used to dynamically route wavelength channels in an optical communications network. For example, a WSS can independently route a particular wavelength channel (e.g., a wavelength channel included in an optical signal comprising one or more wavelength channels) from any of multiple inbound ports of the WSS to any of multiple outbound ports of the WSS.

SUMMARY

In some implementations, an opto-mechanical assembly includes an inner enclosure included within an outer enclosure of the opto-mechanical assembly; a first thermal control element disposed on a region of a first section of the inner enclosure; a second thermal control element disposed on a region of a second section of the inner enclosure, wherein the second section is approximately parallel to the first section; and an optical element that includes a first portion and a second portion, wherein: a distance of the first portion of the optical element to the first section of the inner enclosure is less than a distance from the second portion of the optical element to the first section of the inner enclosure, a distance of the second portion of the optical element to the second section of the inner enclosure is less than a distance from the first portion of the optical element to the second section of the inner enclosure, the second portion of the optical element contacts the second section of the inner enclosure, the first thermal control element is configured to cause the first portion of the optical element to be associated with a first temperature, and the second thermal control element is configured to cause the second portion of the optical element to be associated with a second temperature, wherein a difference between the first temperature and the second temperature satisfies a temperature difference threshold.

In some implementations, an opto-mechanical assembly includes a first thermal control element disposed on a region of a first section of an enclosure of the opto-mechanical assembly; and a second thermal control element disposed on a region of a second section of the enclosure, wherein: the first section and the second section are approximately parallel to a particular plane, the first thermal control element is configured to heat a first portion of an optical element disposed between the first section and the second section, and the second thermal control element is configured to heat a second portion of the optical element, wherein heating the first portion of the optical element and heating the second portion of the optical element causes a temperature gradient along an axis of the optical element to satisfy a temperature gradient threshold, and wherein the axis of the optical element is approximately perpendicular to the particular plane.

In some implementations, a method includes obtaining, by one or more processors associated with an opto-mechanical assembly and from a first temperature sensor of the opto-mechanical assembly, first temperature data associated with a first section of an enclosure of the opto-mechanical assembly; controlling, by the one or more processors and based on the first temperature data, a first thermal control element of the opto-mechanical assembly to cause a first portion of an optical element included within the enclosure of the opto-mechanical assembly to be associated with a first temperature; obtaining, by the one or more processors and from a second temperature sensor of the opto-mechanical assembly, second temperature data associated with a second section of the enclosure of the opto-mechanical assembly; and controlling, by the one or more processors and based on the second temperature data, a second thermal control element of the opto-mechanical assembly to cause a second portion of the optical element to be associated with a second temperature, wherein controlling the first thermal control element and controlling the second thermal control element causes a difference between the first temperature and the second temperature to satisfy a temperature difference threshold.

DETAILED DESCRIPTION

Figure 1:
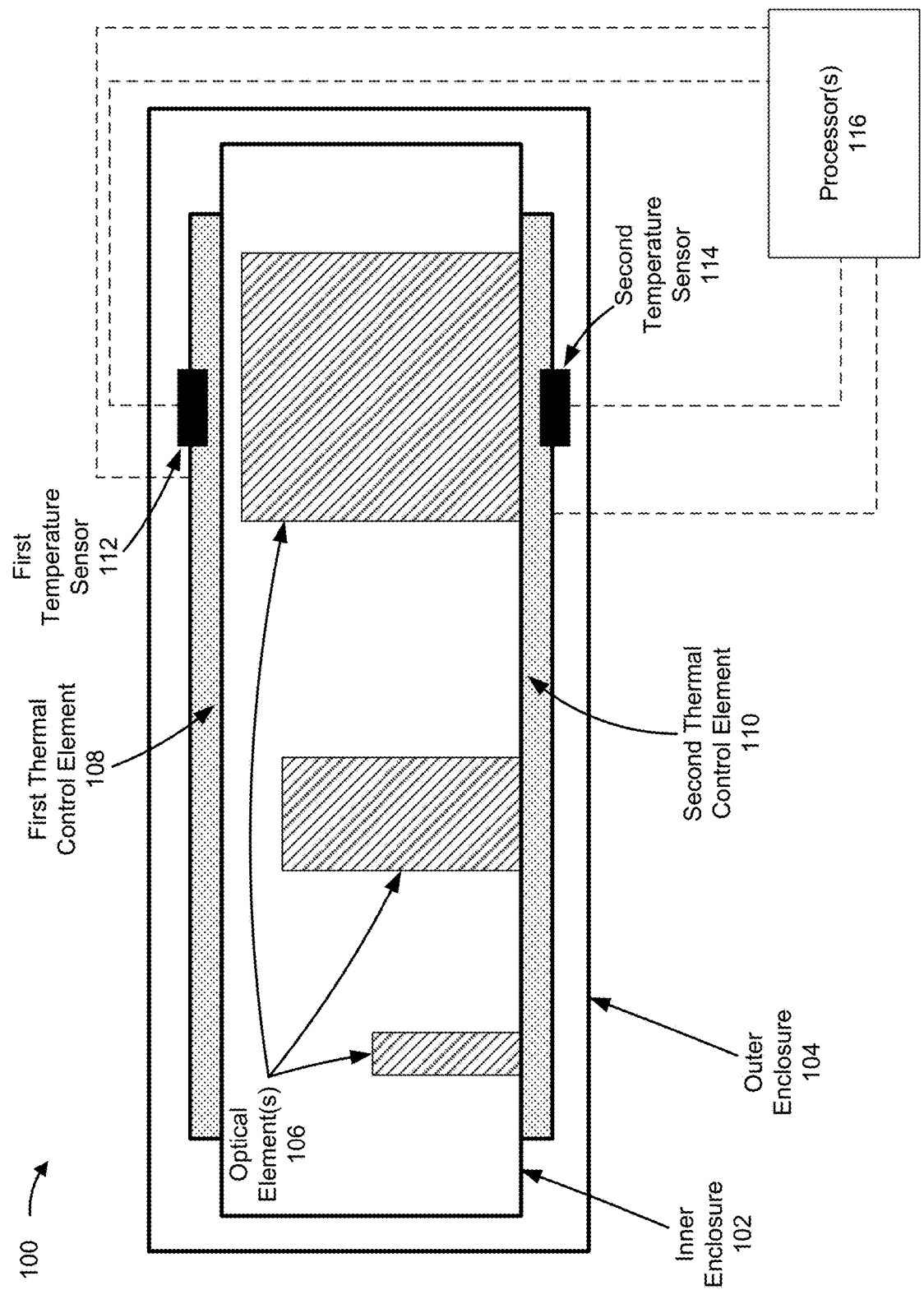
FIG. 1 is a side-view diagram of an example opto-mechanical assembly described herein.

The following detailed description of example implementations refers to the accompanying drawings. The same reference numbers in different drawings may identify the same or similar elements.

An opto-mechanical assembly, such as a wavelength selective switch (WSS), may include a set of optical elements that are configured to facilitate routing wavelength channels (e.g., that are included in an optical signal) in an optical communications network. In many cases, a uniform temperature distribution on the set of optical elements is desired in order to ensure a consistent performance of the set of optical elements. However, it is challenging to provide a uniform temperature distribution on the set of optical elements while also minimizing power consumption associated with maintaining the uniform temperature distribution and reducing a warm-up time of the opto-mechanical assembly (e.g., from a cold-start).

For example, in some cases, a conventional WSS includes a single heater attached directly to a bottom of an optical bench assembly of the WSS. However, this can create a large temperature gradient on the optical elements of the WSS (e.g., a change of greater than 5 degrees Celsius (C) along a vertical axis of the optical elements). As another example, in some cases, a conventional WSS includes multiple heaters attached to an isothermal enclosure (e.g., that comprises aluminum) of the WSS. However, because the heaters are not directly attached to an optical bench assembly of the WSS, and because of the added thermal mass of such an isothermal enclosure, the heaters consume high amounts of power to provide heat to the optical elements of the WSS, and the WSS has a long warm-up time.

Some implementations described herein provide an opto-mechanical assembly that includes an inner enclosure (e.g., a thermally conductive enclosure) and an outer enclosure (e.g., a thermally insulative enclosure). The opto-mechanical assembly may include a set of optical elements disposed within the inner enclosure and/or mechanically attached to a bottom section (also referred to as an optical bench) of the inner enclosure. The opto-mechanical assembly may include a first thermal control element disposed on a region of a top section of the inner enclosure and a first temperature sensor disposed on a different region of the top section of the inner enclosure. Further, the opto-mechanical assembly include a second thermal control element disposed on a region of the bottom section of the inner enclosure and a second temperature sensor disposed on a different region of the bottom section of the inner enclosure. The opto-mechanical assembly may include one or more processors that are configured to control the first thermal control element and/or the second thermal control element based on respective temperature data obtained from the first temperature sensor and the second temperature sensor. Accordingly, in some implementations, the one or more processors may control the first thermal control element and the second thermal control element to minimize a difference between a first temperature associated with the top section of the inner enclosure and a second temperature associated with the bottom section of the inner enclosure.

In this way, the one or more processors control the first thermal control element and the second thermal control element to cause a temperature gradient along an axis of an optical element (e.g., along a vertical axis of the optical element), of the set of optical elements, to satisfy (e.g., to be less than or equal to) a temperature gradient threshold (e.g., that is less than or equal to 1 degree C., 2 degrees C., 3 degrees C., or 5 degrees C., among other examples). This causes the optical element, and/or the set of optical elements, to provide a consistent performance. Further, because the first thermal control element and/or the second thermal control element are directly attached to the inner enclosure, and because the inner enclosure is a thermally conductive enclosure, the first thermal control element and the second thermal control element consume less power to provide a uniform temperature distribution on the set of optical elements (e.g., as compared to a conventional WSS that includes multiple thermal control elements attached to an isothermal enclosure) and the opto-mechanical assembly has a shorter warm-up time (e.g., as compared to the conventional WSS).

FIG. 1 is a side-view diagram of an example opto-mechanical assembly 100 described herein. The opto-mechanical assembly 100 may be used for dynamic routing of wavelength channels in an optical communications network. For example, the opto-mechanical assembly 100 may comprise a WSS and/or a similar opto-mechanical switch. As shown in FIG. 1, the opto-mechanical assembly 100 may include an inner enclosure 102, an outer enclosure 104, a set of optical elements 106, a first thermal control element 108, a second thermal control element 110, a first temperature sensor 112, a second temperature sensor 114, and/or one or more processors 116.

The first thermal control element 108 and the second thermal control element 110 may control a temperature of respective sections, or respective regions of sections, of the inner enclosure 102. At least one of the thermal control element 108 or the thermal control element 110 may be, for example, a resistive thermal control element or other element capable of heating a region or section of the inner enclosure 102, as described herein. Alternatively, at least one of the thermal control element 108 or the thermal control element 110 may be, for example, a thermo-electric cooler or other element capable of cooling a region or section of the inner enclosure 102. While some implementations described herein are directed to the thermal control element 108 and the thermal control element 110 each having heating capabilities, additional implementations include, for example, the thermal control element 108 and the thermal control element 110 each having cooling capabilities, each having heating and cooling capabilities, and one having a heating capability and the other having a cooling capability. Accordingly, examples described herein relating to controlling heating capabilities of the thermal control element 108 and the thermal control element 110 are similarly applicable to controlling cooling capabilities and/or other temperature regulation capabilities of the thermal control element 108 and the thermal control element 110.

As shown in FIG. 1, the outer enclosure 104 may have a bottom section, a top section, a first side section (e.g., a left side section shown in FIG. 1), and a second side section (e.g., a right side section shown in FIG. 1). In some implementations, the bottom section and the top section of the outer enclosure 104 may be approximately parallel (e.g., within a tolerance, such as 1 degree or 2 degrees) to each other and to a first plane (e.g., a horizontal plane) and the first side section and the second side section of the outer enclosure 104 may be approximately parallel to each other and to a second plane that is perpendicular to the first plane (e.g., a vertical plane). As further shown in FIG. 1, the inner enclosure 102 may be included within the outer enclosure 104. For example, the inner enclosure 102 may disposed within an internal portion of the outer enclosure 104 defined by the bottom section, the top section, the first side section, and the second side section of the outer enclosure 104.

The outer enclosure 104 may be configured to provide thermal insulation for the inner enclosure 102 and/or the other components of the opto-mechanical assembly 100. For example, the outer enclosure 104 may comprise plastic or another thermally insulative material. In some implementations, the outer enclosure 104 may be configured to provide structural support for the inner enclosure 102 and/or other components of the opto-mechanical assembly 100. For example, the outer enclosure 104 may be mechanically attached to the inner enclosure 102 via mechanical attachment components, such as isolation mounts, soft mounts, hard mounts, hard or soft epoxy, rubber-like materials, and/or other materials. In some implementations, the outer enclosure 104 may be configured to protect the inner enclosure 102 and/or the other components of the opto-mechanical assembly 100 from an external environment. For example, the outer enclosure 104 may be a hermetic enclosure that protects the inner enclosure 102 and/or the other components of the opto-mechanical assembly 100 from particulate matter, such as dust, dirt, water, and/or other debris.

As further shown in FIG. 1, the inner enclosure 102 may include a bottom section (also referred to an "optical bench"), a top section, a first side section (e.g., a left side section shown in FIG. 1), and/or a second side section (e.g., a right side section shown in FIG. 1). The bottom section and the top section of the inner enclosure 102 may be approximately parallel (e.g., within a tolerance, such as 1 degree or 2 degrees) to each other and to the first plane (e.g., the horizontal plane) and the first side section and the second side section of the inner enclosure 102 may be approximately parallel to each other and to the second plane that is perpendicular to the first plane (e.g., the vertical plane).

The inner enclosure 102 may be configured to be thermally conductive. For example, the inner enclosure 102 may comprise a thermally conductive material (e.g., with thermal conductivity that is greater than or equal 170 watts per meter-Kelvin (W/m-K)), such as aluminum nitride. The inner enclosure 102 may be configured to provide structural support for the set of optical elements 106, the first thermal control element 108, the second thermal control element 110, the first temperature sensor 112, and/or the second temperature sensor 114. For example, as shown in FIG. 1, the set of optical elements 106 may be disposed on the bottom section of the inner enclosure 102 (e.g., an internal side of the bottom section of the inner enclosure 102), the first thermal control element 108 and/or the first temperature sensor 112 may be disposed on the top section of the inner enclosure 102 (e.g., an external side or an internal side of the top section of the inner enclosure 102), and/or the second thermal control element 110 and/or the second temperature sensor 114 may be disposed on the bottom section of the inner enclosure 102 (e.g., an external side or an internal side of the bottom section of the inner enclosure 102). In some implementations, the set of optical elements 106, the first thermal control element 108, the second thermal control element 110, the first temperature sensor 112, and/or the second temperature sensor 114 may be mechanically attached to the inner enclosure 102 (e.g., via mechanical attachment components, such as soft mounts, hard mounts, hard or soft epoxy, rubber-like materials, and/or other materials).

In some implementations, a heat flow associated with a side (e.g., between the side and an external environment of the side) of the inner enclosure 102 may be different than a heat flow associated with another side (e.g., between the other side and an external environment of the other side) of the inner enclosure 102. For example, a heat flow between the bottom section of the inner enclosure 102 and an external environment associated with the bottom section (e.g., an environment between the external side of the bottom section of the inner enclosure 102 and an internal side of the bottom section of the outer enclosure 104) may be different than a heat flow between the top section of the inner enclosure 102 and an external environment associated with the top section (e.g., an environment between the external side of the top section of the inner enclosure 102 and an internal side of the top section of the outer enclosure 104). This may be because the bottom section of the inner enclosure 102 includes attachment components for the set of optical elements 106 (e.g., mechanical attachment components for attaching the set of optical elements 106 to the bottom section of the inner enclosure 102; electrical attachment components for attaching the set of optical elements 106 to electrical components, such as a printed circuit board (PCB) for controlling the set of optical elements 106; and/or other attachment components) and the top section of the inner enclosure 102 does not. Additionally, or alternatively, this may be because the bottom section of the inner enclosure 102 and the top section of the inner enclosure 102 are subject to different amounts of air flow (or gas flow) within the inner enclosure 102.

The set of optical elements 106 may include at least one of a lens, a grating, a prism, a grism, a mirror, a refractive optical element, a reflective optical element, a diffractive optical element, and/or any other type of optical element. As shown in FIG. 1, the set of optical elements 106 may be disposed between the bottom section of the inner enclosure 102 and the top section of the inner enclosure 102. An optical element may include a top portion and a bottom portion. For example, a distance of the top portion of the optical element to the top section of the inner enclosure may be less than a distance from the bottom portion of the optical element to the top section of the inner enclosure and/or a distance of the bottom portion of the optical element to the bottom section of the inner enclosure may be less than a distance from the top portion of the optical element to the bottom section of the inner enclosure.

In some implementations, the set of optical elements 106 may be disposed on and/or mechanically attached to the bottom section of the inner enclosure 102 (e.g., an internal side of the bottom section of the inner enclosure 102). In some implementations, each optical element 106, of the set of optical elements 106, may be disposed on and/or mechanically attached to a respective region of the bottom section of the inner enclosure 102 (e.g., a respective region of the internal side of the bottom section of the inner enclosure 102). As shown in FIG. 1, respective top portions of one or more optical elements 106, of the set of optical elements 106, may not contact the top section of the inner enclosure 102. Stated another way, the one or more optical elements 106 may not be disposed on the top section of the inner enclosure (e.g., not disposed on an internal side of the top section of the inner enclosure 102). For example, a distance between an end (e.g., a top portion) of an optical element 106 and the top section of the inner enclosure 102 (e.g., the internal side of the top section of the inner enclosure 102) may be greater than or equal to a distance threshold such as 10 microns, 15 microns, 25 microns, 100 microns, or 1000 microns, among other examples (e.g., to facilitate air flow or gas flow within the inner enclosure 102).

As described above, the first thermal control element 108 may be disposed on and/or mechanically attached to the top section of the inner enclosure 102 (e.g., the external side of the top section of the inner enclosure 102). The first thermal control element 108 may be configured as a heater and may include a set of first electrical traces (referred to hereinafter as a top set of electrical traces) that are configured to emit heat (e.g., when an electrical signal is applied to the top set of electrical traces). In some implementations, the first thermal control element 108 is disposed on one or more regions of the top section of the inner enclosure 102 (e.g., one or more regions of the external side of the top section of the inner enclosure 102). For example, a first electrical trace, of the top set of electrical traces, may be disposed on a first region of the top section of the inner enclosure 102, and a second electrical trace, of the top set of electrical traces, may be disposed on a second region of the top section of the inner enclosure 102, where the first region and the second region do not overlap. In some implementations, the first electrical trace may have a heating capability (e.g., a capability to emit a first amount of heat) that is different than a heating capability of the second electrical trace (e.g., a capability to emit a second amount of heat). For example, a thickness and/or a width of the first electrical trace may be different than a thickness and/or a width of the second electrical trace (e.g., a difference between the thickness and/or the width of the first electrical trace and the thickness and/or the width of the second electrical trace is greater than 0 microns), which may cause the first electrical trace to be capable of emitting a different amount of heat than that which the second electrical trace is capable of emitting.

As described above, the first temperature sensor 112 may be disposed on and/or mechanically attached to the top section of the inner enclosure 102 (e.g., the external side or the internal side of the top section of the inner enclosure 102). For example, the first temperature sensor 112 may be disposed on a region of the top section of the inner enclosure 102 on which the first thermal control element 108 is not disposed. Alternatively, the first temperature sensor 112 may be disposed on an optical element 106 of the set of optical elements 106 (e.g., a top portion of the optical element 106 that is closer to the top section of the inner enclosure 102 than a bottom portion of the optical element 106). The first temperature sensor 112 may be associated with the first thermal control element 108, the top section of the inner enclosure 102, and/or the set of optical elements 106. For example, the first temperature sensor 112 may be configured to determine a temperature of the top section of the inner enclosure 102 (e.g., the external side or the internal side of the top section of the inner enclosure 102) and/or at least one optical element 106 (e.g., a top portion of the at least one optical element 106), of the set of optical elements 106 (e.g., based on the heat emitted by the first thermal control element 108).

As described above, the second thermal control element 110 may be disposed on and/or mechanically attached to the bottom section of the inner enclosure 102 (e.g., the external side of the bottom section of the inner enclosure 102). The second thermal control element 110 may be configured as a heater and may have a heating capability that is different than a heating capability of the first thermal control element 108. For example, a difference between an amount of heat that the second thermal control element 110 is capable of emitting and an amount of heat emitted that the first thermal control element 108 is capable of emitting may be greater than 0 W.

The second thermal control element 110 may include a set of second electrical traces (referred to hereinafter as a "bottom set of electrical traces") that are configured to emit heat (e.g., when an electrical signal is applied to the bottom set of electrical traces). In some implementations, the second thermal control element 110 is disposed on one or more regions of the bottom section of the inner enclosure 102 (e.g., one or more regions of the external side of the bottom section of the inner enclosure 102). For example, a first electrical trace, of the bottom set of electrical traces, may be disposed on a first region of the bottom section of the inner enclosure 102, and a second electrical trace, of the bottom set of electrical traces, may be disposed on a second region of the bottom section of the inner enclosure 102, where the first region and the second region do not overlap. In some implementations, the first electrical trace may have a heating capability that is different than a heating capability of the second electrical trace. For example, the first electrical trace may have a thickness and/or a width that is different than a thickness and/or a width of the second electrical trace, which may cause the first electrical trace to be capable of emitting a different amount of heat than that which the second electrical trace is capable of emitting.

As described above, the second temperature sensor 114 may be disposed on and/or mechanically attached to the bottom section of the inner enclosure 102 (e.g., the external side or the internal side of the bottom section of the inner enclosure 102). For example, the second temperature sensor 114 may be disposed on a region of the bottom section of the inner enclosure 102 on which the second thermal control element 110 is not disposed. Alternatively, the second temperature sensor 114 may be disposed on an optical element 106, of the set of optical elements 106 (e.g., a bottom portion of the optical element 106 that is closer to the bottom section of the inner enclosure 102 than a top portion of the optical element 106). The second temperature sensor 114 may be associated with the second thermal control element 110, the bottom section of the inner enclosure 102, and/or the set of optical elements 106. For example, the second temperature sensor 114 may be configured to determine a temperature of the bottom section of the inner enclosure 102 (e.g., the external side or the internal side of the bottom section of the inner enclosure 102) and/or at least one optical element 106 (e.g., a bottom portion of the at least one optical element 106), of the set of optical elements 106 (e.g., based on the heat emitted by the second thermal control element 110).

The one or more processors 116 may be associated with the first thermal control element 108, the second thermal control element 110, the first temperature sensor 112, and/or the second temperature sensor 114. For example, the one or more processors 116 may be communicatively coupled with the first temperature sensor 112 and the second temperature sensor 114 to obtain respective temperature data from the first temperature sensor 112 and/or the second temperature sensor 114. As another example, the one or more processors 116 may be communicatively coupled with the first thermal control element 108 and/or the second thermal control element 110 to allow the one or more processors 116 to control operation of the first thermal control element 108 and/or the second thermal control element 110. The one or more processors 116 may include one or more processors 320 described herein in relation to FIG. 3.

In some implementations, the one or more processors 116 may obtain first temperature data from the first temperature sensor 112 and/or second temperature data from the second temperature sensor 114. The first temperature data may indicate a first temperature, such as a temperature of the top section of the inner enclosure 102 (e.g., the external side or the internal side of the top section of the inner enclosure 102) and/or at least one optical element 106 (e.g., a top portion of the at least one optical element 106) of the set of optical elements 106. The second temperature data may indicate a second temperature, such as a temperature of the bottom section of the inner enclosure 102 (e.g., the external side or the internal side of the bottom section of the inner enclosure 102) and/or at least one optical element 106 (e.g., a bottom portion of the at least one optical element 106) of the set of optical elements 106.

The one or more processors 116 may control the first thermal control element 108 based on the first temperature data. For example, the one or more processors 116 may process the first temperature data to determine that the first temperature is less than a first particular temperature (e.g., a temperature, associated with the top section of the inner enclosure 102, within a range of temperatures at which the set of optical elements 106 provide a particular performance). Accordingly, the one or more processors 116 may cause (e.g., by sending a control signal or a control message to the first thermal control element 108) the first thermal control element 108 to activate (or to remain activated). This may cause the first temperature to increase. Alternatively, the one or more processors may cause 116 (e.g. by changing a voltage or a current supplied to the first thermal control element 108) the first temperature to increase. Additionally, or alternatively, the one or more processors 116 may process the first temperature data to determine that the first temperature is greater than or equal to the first particular temperature. Accordingly, the one or more processors 116 may cause (e.g., by sending a control signal or a control message to the first thermal control element 108) the first thermal control element 108 to deactivate (or to remain deactivated). This may cause the first temperature to decrease or to remain the same. Alternatively, the one or more processors may cause (e.g. by changing a voltage or a current supplied to the first thermal control element 108) the first temperature to decrease or to remain the same.

The one or more processors 116 may control the second thermal control element 110 based on the second temperature data. For example, the one or more processors 116 may process the second temperature data to determine that the second temperature is less than a second particular temperature (e.g., a temperature, associated with the bottom section of the inner enclosure 102, within a range of temperatures at which the set of optical elements 106 provide a particular performance). Accordingly, the one or more processors 116 may cause (e.g., by sending a control signal or a control message to the second thermal control element 110) the second thermal control element 110 to activate (or to remain activated). This may cause the second temperature to increase. Alternatively, the one or more processors may cause (e.g. by changing a voltage or a current supplied to the second thermal control element 110) the second temperature to increase. Additionally, or alternatively, the one or more processors 116 may process the second temperature data to determine that the second temperature is greater than or equal to the second particular temperature. Accordingly, the one or more processors 116 may cause (e.g., by sending a control signal or a control message to the second thermal control element 110) the second thermal control element 110 to deactivate (or to remain deactivated). This may cause the second temperature to decrease or to remain the same. Alternatively, the one or more processors may cause (e.g. by changing a voltage or a current supplied to the second thermal control element 110) the second temperature to decrease or to remain the same.

In this way, the one or more processors 116 may cause the first temperature to be approximately the same as the first particular temperature and/or the second temperature to be approximately the same as the second particular temperature. In some implementations, such as when the first temperature sensor 112 and the second temperature sensor 114 are attached to an optical element 106, of the set of optical elements 106, the first particular temperature and the second particular temperature may be equal to each other (e.g., within a tolerance, such as 1 degree C. or 2 degrees C.) because the first particular temperature and the second particular temperature are both directly associated with an internal environment of the inner enclosure 102. Accordingly, the one or more processors 116 may control the first thermal control element 108 and/or the second thermal control element 110 to cause a difference between the first temperature and the second temperature to satisfy (e.g., be less than or equal to) a first temperature difference threshold (e.g., that is less than or equal to 1 degree Celsius (C), 2 degrees C., 3 degrees C., or 5 degrees C., among other examples).

In some implementations, such as when the first temperature sensor 112 and the second temperature sensor 114 are respectively attached to the top section of the inner enclosure 102 (e.g., the external side of the top section of the inner enclosure 102) and the bottom section of the inner enclosure 102 (e.g., the external side of the bottom section of the inner enclosure 102), the first particular temperature and the second particular temperature may be different (e.g., a difference between the first particular temperature and the second particular temperature may be greater than 2 degrees C.) because the first particular temperature and the second particular temperature are both indirectly associated with the internal environment of the inner enclosure 102 or are associated with different external environments. Accordingly, the one or more processors 116 may control the first thermal control element 108 and/or the second thermal control element 110 to cause a difference between the first temperature and the second temperature to satisfy (e.g., be less than or equal to) a second temperature difference threshold (e.g., that equals the first temperature difference threshold plus a difference between the first particular temperature and the second particular temperature).

Additionally, or alternatively, the one or more processors 116 may control each of the first thermal control element 108 and the second thermal control element 110 based on the first temperature data and the second temperature data. For example, the one or more processors 116 may process the first temperature data and the second temperature data to determine whether a difference between the first temperature and the second temperature satisfies (e.g., is greater than) a temperature difference threshold (e.g., the first temperature difference threshold or the second temperature difference threshold, described above). Accordingly, based on determining that the difference threshold has been satisfied, the one or more processors 116 may determine that the first temperature is greater than the second temperature and therefore may cause (e.g., by sending a control signal or a control message to the second thermal control element 110) the second thermal control element 110 to activate (or to remain activated), which may cause the second temperature to increase, and/or may cause (e.g., by sending a control signal or control message to the first thermal control element 108) the first thermal control element 108 to deactivate (or to remain deactivated), which may cause the first temperature to decrease or to remain the same. Alternatively, based on determining that the difference threshold has been satisfied, the one or more processors 116 may determine that the first temperature is greater than the second temperature and therefore may cause (e.g. by changing a voltage or a current supplied to the second thermal control element 110) the second temperature to increase, and/or may cause (e.g. by changing a voltage or current supplied to the first thermal control element 108) the first temperature to decrease.

Alternatively, based on determining that the difference threshold has been satisfied, the one or more processors 116 may determine that the second temperature is greater than the first temperature and therefore may cause (e.g., by sending a control signal or a control message to the second thermal control element 110) the second thermal control element 110 to deactivate (or to remain deactivated), which may cause the second temperature to decrease or to remain the same, and/or may cause (e.g., by sending a control signal or control message to the first thermal control element 108) the first thermal control element 108 to activate (or to remain activated), which may cause the first temperature to increase. Alternatively, based on determining that the difference threshold has been satisfied, the one or more processors 116 may determine that the second temperature is greater than the first temperature and therefore may cause (e.g. by changing a voltage or a current supplied to the second thermal control element 110) the second temperature to decrease, and/or may cause (e.g. by changing a voltage or a current supplied to the first thermal control element 108) the first temperature to increase.

In this way, the one or more processors 116 may cause the difference between the first temperature and the second temperature to be minimized (e.g., to be less than or equal to the temperature difference threshold). Further, by controlling the first thermal control element 108 and/or the second thermal control element 110 as described herein, the one or more processors 116 may cause a temperature gradient (e.g., a vertical temperature gradient) across a length (e.g., a vertical length) of an optical element 106, of the set of optical elements 106, to satisfy (e.g., be less than or equal to) a temperature gradient threshold (e.g., that is less than or equal to 1 degree C. per centimeter (cm), 2 degrees C. per cm, 3 degrees C. per cm, or 5 degrees C. per cm, among other examples). Accordingly, this may improve a performance of the optical element 106 and/or the set of optical elements 106 during operation of the opto-mechanical assembly 100.

While some implementations described herein are directed to the first thermal control element 108 and/or the first temperature sensor 112 being disposed on and/or mechanically attached to the top section of the inner enclosure 102 and the second thermal control element 110 and/or the second temperature sensor 114 being disposed on and/or mechanically attached to the bottom section of the inner enclosure 102, implementations include thermal control elements and/or temperature sensors disposed on any section of the inner enclosure 102. Further, while some implementations described herein are directed to the set of optical elements 106 being disposed on and/or mechanically attached to the bottom section of the inner enclosure 102, the set of optical elements 106 may be disposed on and/or mechanically attached to any section of the inner enclosure 102. In some implementations, there may be multiple first temperature sensors 112 and/or multiple second temperature sensors 114 disposed on one or more optical elements 106 of the set of optical elements 106.

Moreover, the one or more processors 116 may obtain temperature data from the temperature sensors and may control the thermal control elements in a similar manner as that described herein. In this way, the one or more processors 116 may cause respective temperature gradients (e.g., vertical temperature gradients, horizontal temperature gradients, diagonal temperature gradients, and/or other temperature gradients) across one or more lengths (e.g., a vertical length, a horizontal length, a diagonal length, and/or another length) of an optical element 106, of the set of optical elements 106, to satisfy (e.g., be less than or equal to) a temperature gradient threshold (e.g., that is less than or equal to 1 degree C. per cm, 2 degrees C. per cm, 3 degrees C. per cm, or 5 degrees C. per cm, among other examples). Accordingly, this may improve a performance of the optical element 106 and/or the set of optical elements 106 during operation of the opto-mechanical assembly 100.

As indicated above, FIG. 1 is provided as an example. Other examples may differ from what is described in connection with FIG. 1.

Figure 2:
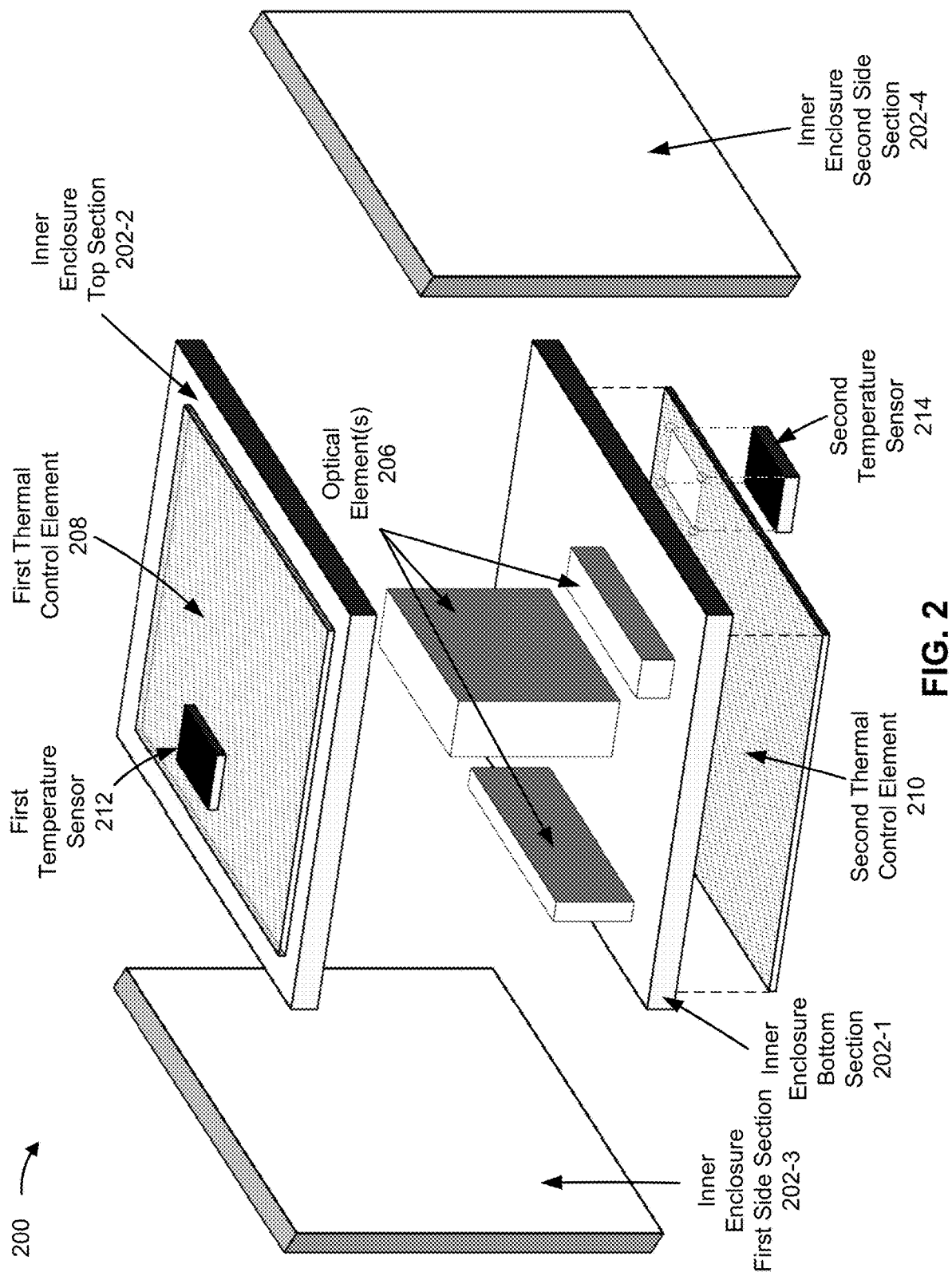
FIG. 2 is an exploded view of an example opto-mechanical assembly described herein.

FIG. 2 is an exploded view of an example opto-mechanical assembly 200 described herein. The opto-mechanical assembly 200 may include an inner enclosure 202 (e.g., that includes, as shown in FIG. 2, a bottom section 202-1, a top section 202-2, a first side section 202-3, and a second side section 202-4), an outer enclosure 204 (not shown in FIG. 2), a set of optical elements 206, a first thermal control element 208, a second thermal control element 210, a first temperature sensor 212, a second temperature sensor 214, and/or one or more processors 216 (not shown in FIG. 2) that are respectively the same as, or similar to, the inner enclosure 102, the outer enclosure 104, the set of optical elements 106, the first thermal control element 108, the second thermal control element 110, the first temperature sensor 112, the second temperature sensor 114, and/or the one or more processors 116 of the opto-mechanical assembly 100 described herein in relation to FIG. 1.

As shown in FIG. 2, the bottom section 202-1 and the top section 202-2 of the inner enclosure 202 may be approximately parallel (e.g., within a tolerance, such as 1 degree or 2 degrees) to each other and to a first plane (e.g., a horizontal plane) and the first side section 202-3 and the second side section 202-4 of the inner enclosure 202 may be approximately parallel to each other and to a second plane that is perpendicular to the first plane (e.g., a vertical plane).

As further shown in FIG. 2, the set of optical elements 206 may be disposed between the bottom section 202-1 of the inner enclosure 202 and the top section 202-2 of the inner enclosure 202. In some implementations, each optical element 206, of the set of optical elements 206, may be disposed on and/or mechanically attached to a respective region of the bottom section 202-1 of the inner enclosure 202 (e.g., a respective region of an internal side of the bottom section 202-1 of the inner enclosure 202).

As further shown in FIG. 2, the first thermal control element 208 may be disposed on and/or mechanically attached to the top section 202-2 of the inner enclosure 202 (e.g., an external side of the top section 202-2 of the inner enclosure 202) and the first temperature sensor 212 may be disposed on and/or mechanically attached to the top section 202-2 of the inner enclosure 202 (e.g., the external side of the top section 202-2 of the inner enclosure 202). For example, the first temperature sensor 212 may be disposed on a region of the top section 202-2 of the inner enclosure 202 on which the first thermal control element 208 is not disposed.

As further shown in FIG. 2, the second thermal control element 210 may be disposed on and/or mechanically attached to the bottom section 202-1 of the inner enclosure 202 (e.g., an external side of the bottom section 202-1 of the inner enclosure 202) and the second temperature sensor 214 may be disposed on and/or mechanically attached to the bottom section 202-1 of the inner enclosure 202 (e.g., the external side of the bottom section 202-1 of the inner enclosure 202). For example, the second temperature sensor 214 may be disposed on a region of the bottom section 202-1 of the inner enclosure 202 on which the second thermal control element 210 is not disposed.

As indicated above, FIG. 2 is provided as an example. Other examples may differ from what is described in connection with FIG. 2.

Figure 3:
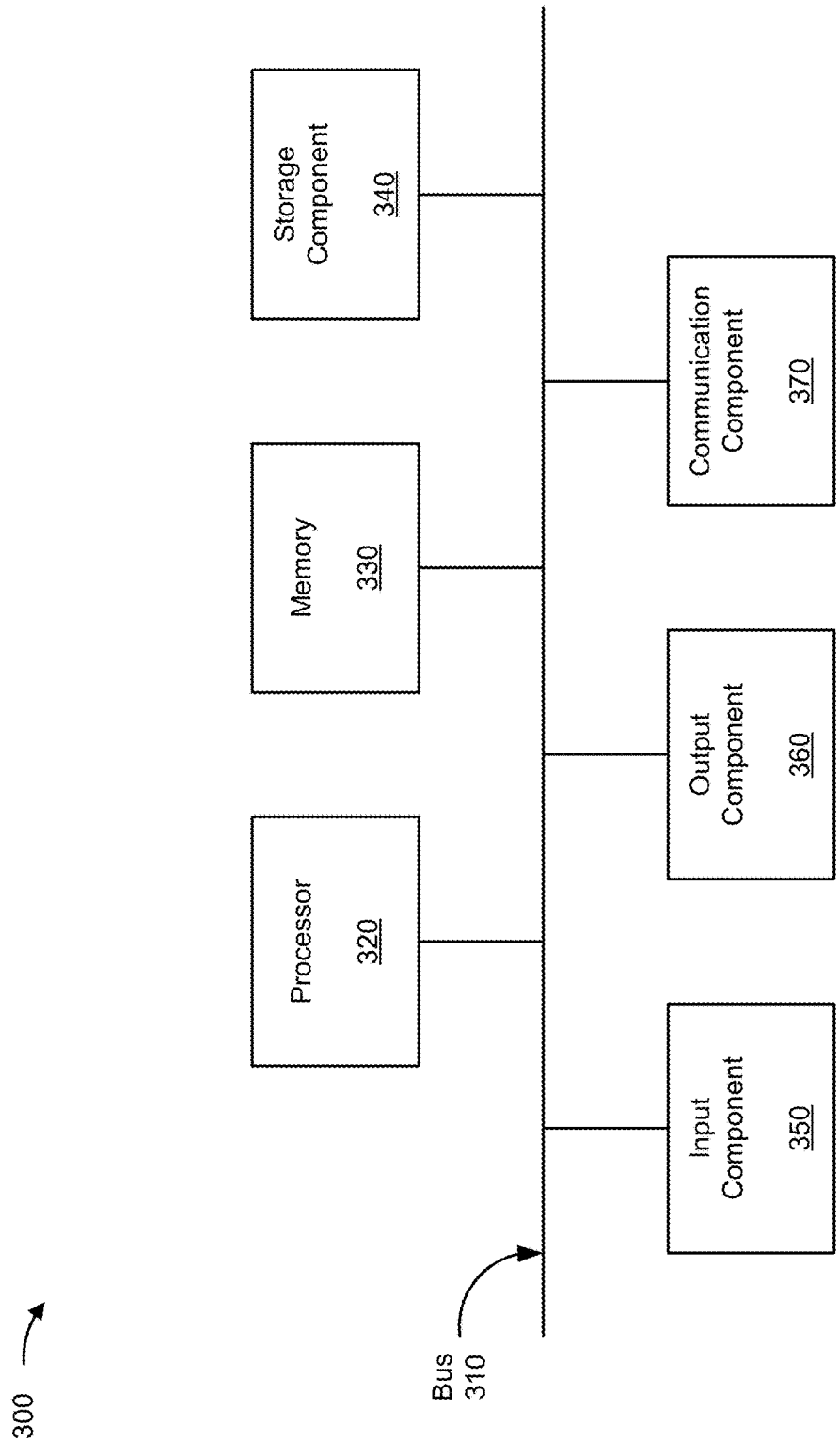
FIG. 3 is a diagram of example components of a device, which may correspond to an opto-mechanical assembly described herein.

FIG. 3 is a diagram of example components of a device 300, which may correspond to the opto-mechanical assembly 100 and/or the opto-mechanical assembly 200. In some implementations, the opto-mechanical assembly 100 and/or the opto-mechanical assembly 200 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
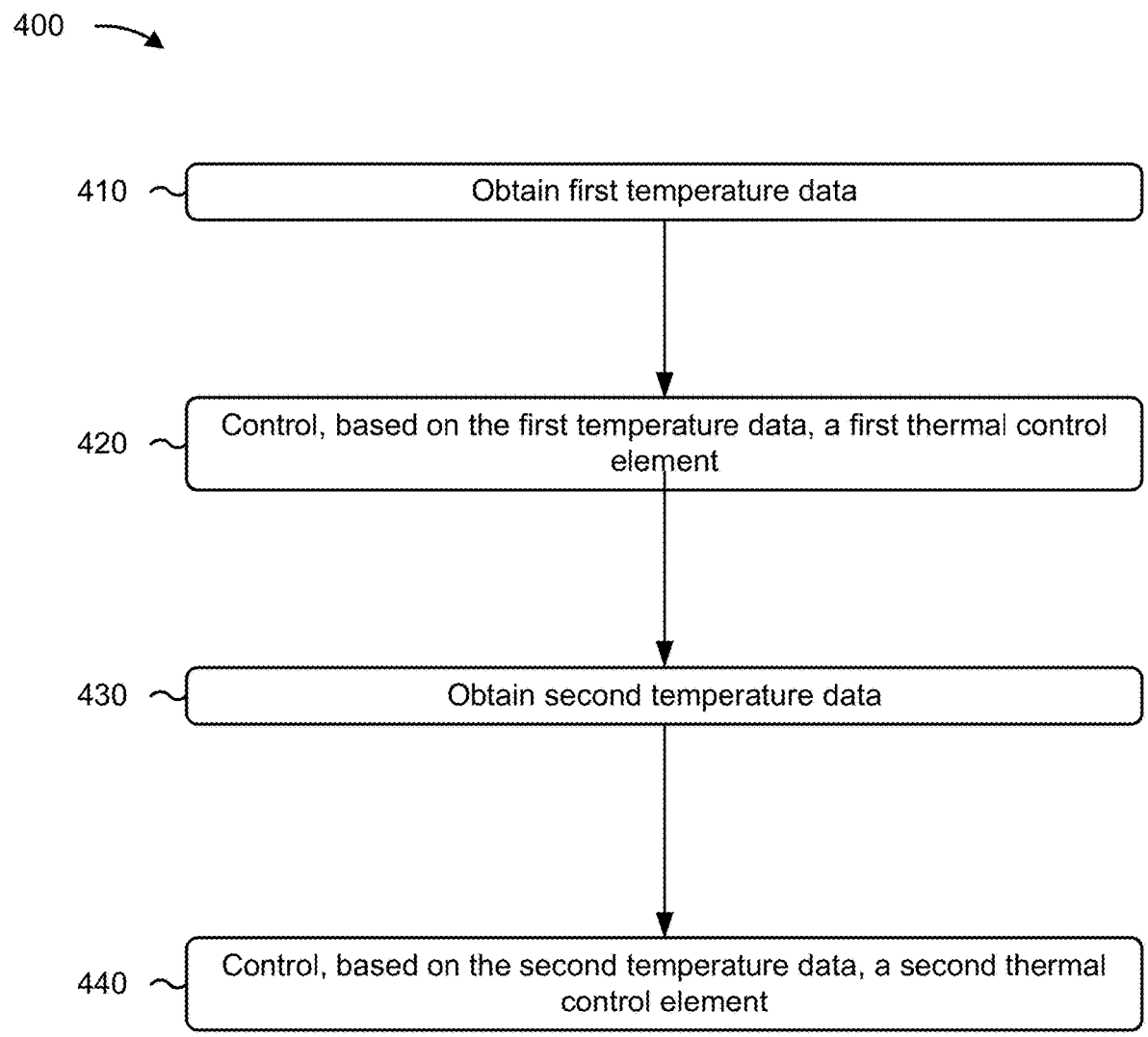
FIG. 4 is a flowchart of an example process associated with a dual thermal control element configuration for an opto-mechanical assembly described herein.

FIG. 4 is a flowchart of an example process 400 associated with a dual thermal control element configuration for an opto-mechanical assembly (e.g., opto-mechanical assembly 100 or opto-mechanical assembly 200). In some implementations, one or more process blocks of FIG. 4 may be performed by one or more processors (e.g., one or more processors 116) of the opto-mechanical assembly. In some implementations, one or more process blocks of FIG. 4 may be performed by another device or a group of devices separate from or including the one or more processors, such as one or more thermal control elements (e.g., first thermal control element 108 and/or second thermal control element 110) of the opto-mechanical assembly and/or one or more temperature sensors (e.g., first temperature sensor 112 and/or second temperature sensor 114) of the opto-mechanical assembly. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include obtaining first temperature data (block 410). For example, the one or more processors may obtain, from a first temperature sensor of the opto-mechanical assembly, first temperature data associated with a first section of an enclosure of the opto-mechanical assembly, as described above.

As further shown in FIG. 4, process 400 may include controlling, based on the first temperature data, a first thermal control element (block 420). For example, the one or more processors may control, based on the first temperature data, a first thermal control element of the opto-mechanical assembly to cause a first portion of an optical element included within the enclosure of the opto-mechanical assembly to be associated with a first temperature, as described above. In some implementations, controlling the first thermal control element comprises identifying, based on the first temperature data, an original first temperature associated with the first portion of the optical element; determining whether the original first temperature is less than a particular temperature; and causing, based on determining whether the original first temperature is less than the particular temperature, the first thermal control element to activate or deactivate, wherein causing the first thermal control element to activate or deactivate causes the first portion of the optical element to be associated with the first temperature.

As further shown in FIG. 4, process 400 may include obtaining second temperature data (block 430). For example, the one or more processors may obtain, from a second temperature sensor of the opto-mechanical assembly, second temperature data associated with a second section of the enclosure of the opto-mechanical assembly, as described above.

As further shown in FIG. 4, process 400 may include controlling, based on the second temperature data, a second thermal control element (block 440). For example, the one or more processors may control, based on the second temperature data, a second thermal control element of the opto-mechanical assembly to cause a second portion of the optical element to be associated with a second temperature. In some implementations, a difference between the first temperature and the second temperature satisfies a temperature difference threshold. The temperature difference threshold may be less than or equal to three degrees Celsius. In some implementations, controlling the first thermal control element and controlling the second thermal control element causes a temperature gradient along an axis of the optical element to satisfy a temperature gradient threshold.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, the term "component" is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "bottom," "above," "upper," "top," "left," "right," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An opto-mechanical assembly, comprising:
   an inner enclosure included within an outer enclosure of the opto-mechanical assembly;
   a first thermal control element disposed on a region of a first section of the inner enclosure;
   a second thermal control element disposed on a region of a second section of the inner enclosure; and
   an optical element that includes a first optical portion and a second optical portion, wherein:
      a distance of the first optical portion of the optical element to the first section of the inner enclosure is less than a distance from the second optical portion of the optical element to the first section of the inner enclosure,
      a distance of the second optical portion of the optical element to the second section of the inner enclosure is less than a distance from the first optical portion of the optical element to the second section of the inner enclosure,
      the second optical portion of the optical element contacts the second section of the inner enclosure,
      the first thermal control element is configured to cause the first optical portion of the optical element to be associated with a first temperature, and
      the second thermal control element is configured to cause the second optical portion of the optical element to be associated with a second temperature,
         wherein a difference between the first temperature and the second temperature satisfies a temperature difference threshold.

2. The opto-mechanical assembly of claim 1, wherein the temperature difference threshold is less than or equal to three degrees Celsius.

3. The opto-mechanical assembly of claim 1, wherein the inner enclosure is configured to have a thermal conductivity that is greater than or equal to 170 watts per meter-Kelvin, and
   wherein a first heat flow between the first section and an external environment of the first section is different than a second heat flow between the second section and an external environment of the second section.

4. The opto-mechanical assembly of claim 1, wherein the optical element includes at least one of:
   a lens;
   a grating;
   a prism;
   a grism;
   a mirror;
   a refractive optical element;
   a reflective optical element; or
   a diffractive optical element.

5. The opto-mechanical assembly of claim 1, wherein a distance between the first optical portion of the optical element and the first section is greater than or equal to 10 microns.

6. The opto-mechanical assembly of claim 1, wherein the first thermal control element includes a set of electrical traces, and
   a first electrical trace, of the set of electrical traces, has a heating capability that is different than a heating capability of a second electrical trace of the set of electrical traces.

7. The opto-mechanical assembly of claim 1, wherein the first thermal control element includes a set of electrical traces, and
at least one of a thickness or a width of a first electrical trace, of the set of electrical traces, is respectively different than a thickness or a width of a second electrical trace of the set of electrical traces.

8. The opto-mechanical assembly of claim 1, further comprising:
a first temperature sensor configured to determine the first temperature; and
a second temperature sensor configured to determine the second temperature.

9. The opto-mechanical assembly of claim 8, wherein:
the first temperature sensor is disposed on another region of the first section; and
the second temperature sensor is disposed on another region of the second section.

10. The opto-mechanical assembly of claim 1, further comprising one or more processors, wherein the one or more processors are configured to:
obtain first temperature data related to the first temperature;
obtain second temperature data related to the second temperature;
control, based on the first temperature data, the first thermal control element; and
control, based on the second temperature data, the second thermal control element,
wherein controlling the first thermal control element and controlling the second thermal control element causes the difference between the first temperature and the second temperature to satisfy the temperature difference threshold.

11. An opto-mechanical assembly, comprising:
a first thermal control element disposed on a region of a first section of an enclosure of the opto-mechanical assembly; and
a second thermal control element disposed on a region of a second section of the enclosure, wherein:
the first section and the second section are approximately parallel to a particular plane,
the first thermal control element is configured to heat a first optical portion of an optical element disposed between the first section and the second section, and
the second thermal control element is configured to heat a second optical portion of the optical element,
wherein heating the first optical portion of the optical element and heating the second optical portion of the optical element causes a temperature gradient along an axis of the optical element to satisfy a temperature gradient threshold,
wherein the second optical portion of the optical element is in contact with the second section, and
wherein the axis of the optical element is approximately perpendicular to the particular plane.

12. The opto-mechanical assembly of claim 11, wherein the temperature gradient threshold is less than or equal to three degrees Celsius per centimeter.

13. The opto-mechanical assembly of claim 11, wherein a heating capability of the first thermal control element is different than a heating capability of the second thermal control element.

14. The opto-mechanical assembly of claim 11, further comprising:
a first temperature sensor configured to determine a first temperature associated with the first optical portion of the optical element; and
a second temperature sensor configured to determine a second temperature associated with the second optical portion of the optical element.

15. The opto-mechanical assembly of claim 14, wherein:
the first temperature sensor is disposed on the first optical portion of the optical element; and
the second temperature sensor is disposed on the second optical portion of the optical element.

16. The opto-mechanical assembly of claim 14, further comprising one or more processors, wherein the one or more processors are configured to:
obtain, from the first temperature sensor, first temperature data related to the first temperature;
obtain, from the second temperature sensor, second temperature data related to the second temperature;
control, based on the first temperature data, the first thermal control element; and
control, based on the second temperature data, the second thermal control element.

17. A method, comprising:
obtaining, by one or more processors associated with an opto-mechanical assembly and from a first temperature sensor of the opto-mechanical assembly, first temperature data associated with a first section of an enclosure of the opto-mechanical assembly;
controlling, by the one or more processors and based on the first temperature data, a first thermal control element of the opto-mechanical assembly to cause a first optical portion of an optical element included within the enclosure of the opto-mechanical assembly to be associated with a first temperature;
obtaining, by the one or more processors and from a second temperature sensor of the opto-mechanical assembly, second temperature data associated with a second section of the enclosure of the opto-mechanical assembly, the second section being parallel to the first section; and
controlling, by the one or more processors and based on the second temperature data, a second thermal control element of the opto-mechanical assembly to cause a second optical portion of the optical element to be associated with a second temperature,
wherein the second optical portion of the optical element is in contact with the second section, and
wherein controlling the first thermal control element and controlling the second thermal control element causes a difference between the first temperature and the second temperature to satisfy a temperature difference threshold.

18. The method of claim 17, wherein the temperature difference threshold is less than or equal to three degrees Celsius.

19. The method of claim 17, wherein controlling the first thermal control element comprises:
identifying, based on the first temperature data, an original first temperature associated with the first optical portion of the optical element;
determining whether the original first temperature is less than a particular temperature; and
causing, based on determining whether the original first temperature is less than the particular temperature, the first thermal control element to activate or deactivate, wherein causing the first thermal control element to activate or deactivate causes the first optical portion of the optical element to be associated with the first temperature.

20. The method of claim 17, wherein controlling the first thermal control element and controlling the second thermal control element causes a temperature gradient along an axis of the optical element to satisfy a temperature gradient threshold.

* * * * *